United States Patent [19]

Cremer et al.

[11] Patent Number: 4,470,318
[45] Date of Patent: Sep. 11, 1984

[54] VEHICLE SEAT AND ADJUSTING ARRANGEMENT THEREOF

[75] Inventors: Heinz P. Cremer, Remscheid; Werner Wittig, Winnweiler, both of Fed. Rep. of Germany

[73] Assignee: Keiper Automobiltechnik GmbH & Co KG, Remscheid-Hasten, Fed. Rep. of Germany

[21] Appl. No.: 389,364

[22] Filed: Jun. 16, 1982

[30] Foreign Application Priority Data

Jun. 19, 1981 [EP] European Pat. Off. ....... 81 104726.5

[51] Int. Cl.³ .......................... F16H 3/34; F16H 55/17
[52] U.S. Cl. .......................................... 74/353; 74/820; 74/436; 297/348; 248/396
[58] Field of Search .................. 74/325, 329, 331, 353, 74/820, 436; 248/394, 396, 422; 297/330, 348, 347

[56] References Cited

U.S. PATENT DOCUMENTS

| | | | |
|---|---|---|---|
| 2,668,581 | 2/1954 | Luketa | 297/330 |
| 2,684,708 | 7/1954 | Luketa | 297/330 |
| 3,241,384 | 3/1966 | Grimm | 74/353 |
| 3,365,163 | 1/1968 | Pickles | 248/394 |
| 3,478,616 | 11/1969 | Smith | 74/436 |
| 3,564,935 | 2/1971 | Vigneri | 74/354 |
| 4,015,812 | 4/1977 | Heesch | 248/396 |
| 4,299,316 | 11/1981 | Reinmoeller | 297/330 |
| 4,326,690 | 4/1982 | Pickles et al. | 248/396 |
| 4,331,313 | 5/1982 | Pickles | 248/394 |

FOREIGN PATENT DOCUMENTS 419283  3/1947  Italy .................. 74/436

Primary Examiner—Allan D. Herrmann
Assistant Examiner—D. Wright
Attorney, Agent, or Firm—Michael J. Striker

[57] ABSTRACT

An arrangement for adjusting a seat of a vehicle has a plurality of adjusting elements arranged to adjust the position of the seat, a drive motor, and a distributing transmission provided within the drive motor and the adjusting elements and including a plurality of driven shafts having gears and connected with the adjusting elements, and at least one intermediate gear driven by the motor, wherein the distributing transmission includes a stepping transmission arranged so that, with a selectable step, the stepping transmission brings the intermediate gear into driving engagement with a gear of a respective one of the driven shafts, and the intermediate gear is fixed in this position without preventing its rotation about its axis.

29 Claims, 16 Drawing Figures

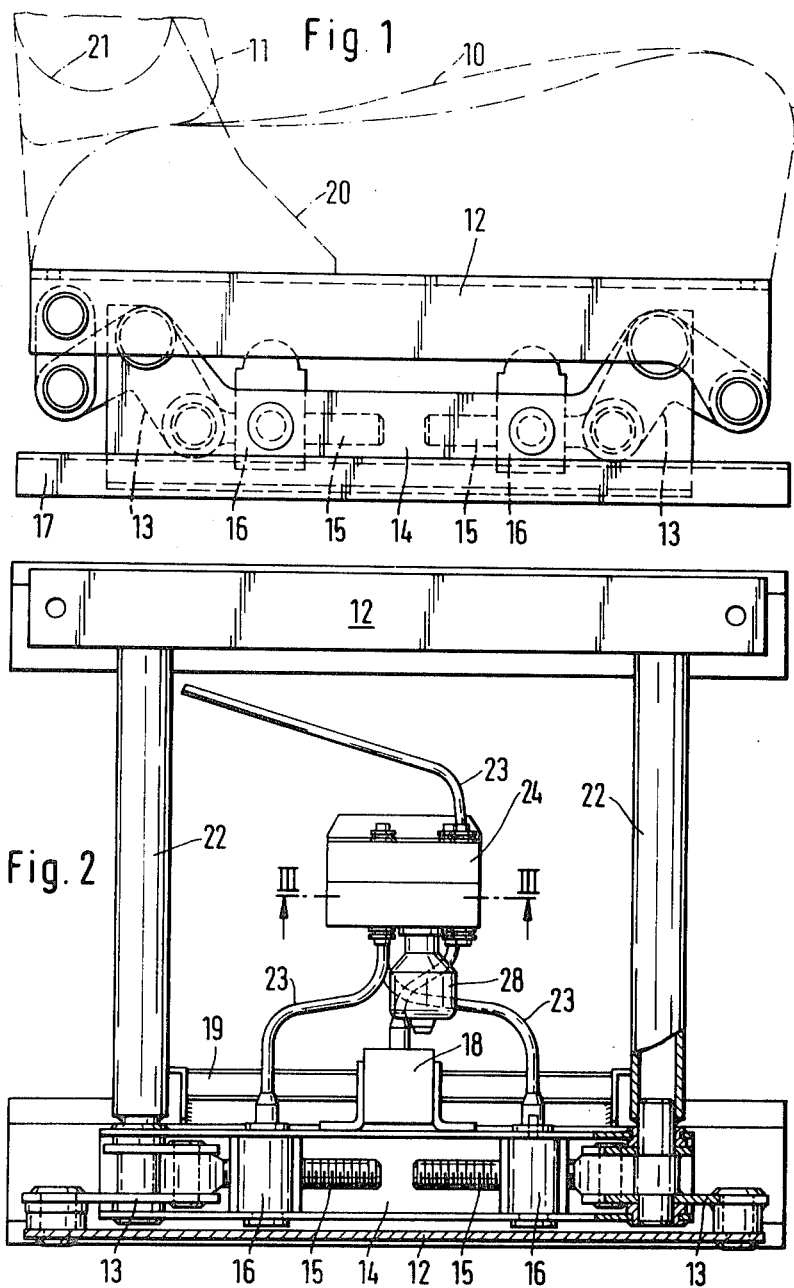

VEHICLE SEAT AND ADJUSTING ARRANGEMENT THEREOF

BACKGROUND OF THE INVENTION

The present invention relates to a seat for vehicles, particularly motor vehicles, as well as to an adjusting arrangement thereof.

More particularly, the present invention relates to a vehicle seat and an arrangement thereof which have a plurality of individual adjusting elements arranged to adjust the seat in correspondence with a seat user and a vehicle, wherein a motor acts via a driving pinion onto different driven shafts of a distributing transmission which actuate these adjusting elements.

Seats used in motor vehicles are adjusted with regard to position of the seat user in the vehicle relative to the actuating elements such as steering wheels, pedals, switches, levers, etc., and also for optimum direct and indirect visibility outside, in height, inclination, and longitudinal direction of the seat. Moreover, it is necessary to provide ergonomically correct fatigue-proof sitting of the seat user by adjusting the seat pad and backrest in the sense of the seat inclination, seat width, lateral support, seat profile, etc., relative to the seat user. For this purpose, modern seats and also their head supports are adjustable in several directions. These seat adjustments can be performed both manually and also by a motor in comfortable manner.

For performing several adjusting movements in the seats of vehicles one after the other with only one drive motor, a distributing transmission is provided in which an adjusting unit of such transmission is composed of electromagnets. The electromagnets are formed annular and are fixedly supported in a housing of the distributing transmission. Each electromagnet surrounds a driven shaft in such a manner that axially displaceable and non-rotatable coupling disks can be pressed in the event of a current supply in the respective electromagnet by the latter to a gear which loosely rotates on the driven shaft. In the known distributing transmission, several driven shafts are arranged adjacent to one another so that at least two driven shafts engage with the pinion of the drive motor, whereas the gears of further driven shafts are in engagement with the gears of the first-mentioned driven shaft. Since the gears are loosely rotatably supported on the driven shaft, a torque transmission is performed via the driven shaft whose electromagnet connects the coupling disk with a gear rotating on the drive shaft to be coupled. When there is no current in the respective electromagnet, a pressure spring arranged between the gear and the coupling disk presses the coupling disk from the gear, so that the coupling connection is lifted. The driven shaft of the distributing transmission can be connected with the respective adjusting elements of the seat frame or the backrest via flexible shafts. Switching of the electromagnet associated with the respective driven shaft can be performed for each adjusting element from the same drive motor.

In addition to the electromagnetically actuating distributing transmission, a mechanically adjustable distributing transmission is known. It has an adjusting element actuated by a servo or auxiliary motor and formed as an adjusting spindle, and an adjusting shoe which engages and disengages couplings on the adjusting spindle. The adjusting shoe, which is displaceable over the adjusting spindle, presses by respective displacement on the adjusting spindle onto the adjusting spindle an adjusting lever associated with the respective coupling into engaging position, so that the coupling, which is connected rotation-fixed but axially displaceable with a driven shaft, is pressed into engagement with a spur gear loosely rotating on the driven shaft. Thereby the rotary movement of the driving pinion is transmitted to the selected driven shaft for such a time until the coupling remains in engagement via the adjusting lever and the adjusting shoe with the threaded spindle. During displacement of the threaded spindle, a spring presses the connected coupling out of engagement and another driven shaft can be connected in the same manner.

The distributing transmission having the mechanical adjusting elements is advantageous as compared with the electromagnetically adjustable distributing transmission, in the sense of the space consumption and economicalm manufacture suitable for mass production, and also in the sense of weight economy. However, the space consumption required for the mechanically adjustable distributing transmission and the number of structural elements are relatively high, so that the manufacturing costs for a mechanically actuated distributing transmission are considerable.

SUMMARY OF THE INVENTION

Accordingly, it is an object of the present invention to provide a seat for a vehicle and an adjusting arrangement thereof, which avoid the disadvantages of the prior art.

More particularly, it is an object of the present invention to provide a vehicle seat, an adjusting arrangement, and distributing transmission, in which it is possible to actuate by one main drive motor different adjusting elements of a seat, wherein the transmission and the adjusting arrangement are more economical, in the sense of the weight and space consumption, than known ones.

In keeping with these objects, and with others which will become apparent hereinafter, one feature of the present invention resides in a distributing transmission which includes a stepping transmission arranged to bring at least one gear in selected step into driving position with the respective gear of a driven shaft, and the gear is fixed in this position without preventing its rotation about its own axis. It is thereby possible to provide a simple positioning of an intermediate gear which serves as the abovementioned gear on a gear of a driven shaft, since each inoperative position of the stepping transmission corresponds to an arresting region and they are equivalent to one another. Since the stepping transmission can be arranged centrally, and the driven shafts can be grouped around the same, a compact, less space-consuming structural unit can be provided.

Stepping transmissions include a stepping mechanism transmission, a rotary arresting transmission, and an adding transmission. While several transmissions of the above-mentioned type can be utilized, it is advantageous when the stepping transmission is formed as a maltese-cross transmission with a driven member which supports the intermediate gear engaging with the driving pinion, and is formed as a rotary maltese-cross disk with radially extending, outwardly open transport slots. It is also possible in this stepping transmission to provide not only the "outer maltese-cross disk" but also a rotary maltese-cross disk with radially extending inwardly open transport slots, so as to form an "inner maltese-cross disk". In both cases, the maltese-cross disk is arranged advantageously coaxially with the driving pinion.

For providing an especially compact distributing transmission, the stepping transmission is formed as a maltese-cross transmission in which a driven member containing a maltese-cross disk is rotatably supported on a central axle and has an eccentric portion on which the intermediate gear is supported. The intermediate gear is in constant engagement with the internal gear of the drive motor, on the one hand, and can selectively engage with one of several gears of the driven shafts which are grouped at predetermined distances, wherein the maltese-cross disk has outwardly open radially extending transport slots. The internal gear is connected advantageously for joint rotation with a worm gear supported on the central axis and engaging with a motor-driven worm forming the drive member. By telescopic arrangement of the internal gear, intermediate gear and maltese-cross disk, as well as arrangement of the structural elements on a central axle, the driven shafts are arranged with the minimum axial distances around the central axis and the drive motor can be arranged outside of the central drive region, Thereby input transmission stages can be used which allow utilization of a weight-favorable fast-running motor.

For exactly positioning the intermediate gears associated with the engaging locations of the maltese-cross transmission relative to the driven shafts, the maltese-cross disk advantageously has transport slots which are uniformly distributed over the periphery of the same, and a blocking groove at the peripheral side provided with slot openings, whereby a blocking disk having a transport finger engages in one of the blocking grooves.

In accordance with another feature of the present invention, the blocking grooves are advantageously formed in the peripheral surface of the maltese-cross disk as cylindrical portions which correspond in form-locking manner to the blocking disk, and the blocking disk has at its periphery a circular recess releasing the periphery of the maltese-cross disk. A transport finger is arranged on a collar of the blocking disk on an extension of the centerline between the center of the blocking disk and the deepest point of the circular recess. The transport finger is composed, advantageously, of a pin fixed on the collar of the blocking disk and surrounded at its outwardly extending end by a noise-damping rolling sleeve which passes in the transport slot of the maltese-cross disk. In this case, the intermediate gear supported on the maltese-cross disk is in constant engagement with the driving pinion arranged centrally to the maltese-cross disk, on the one hand, and exact stepped positioning of the intermediate gear to a position corresponding to the partial angle of the transport slot of the maltese-cross disk is possible, on the other hand. It is to be understood that the gears are arranged with their driven shafts in groups around the maltese-cross disk, and during each step at least one of the gears with the associated driven shaft is connected via the intermediate gear supported on the maltese-cross disk with the driving pinion.

For providing during adjustment of the vehicle seat the possibility of lifting or lowering simultaneously the rear seat region and the front seat region for entire height adjustment of the seat, a further feature of the present invention is that two intermediate gears are arranged on the maltese-cross disk axially offset relative to one another and located adjacent to one another in the circumferential direction. Each of the gears, during respective blocking of the maltese-cross disk, engages simultaneously with the gear of the driven shaft for the front seat-height adjustment and with the gear of the driven shaft for the rear seat-height adjustment.

While the drive of all driven shafts of the distributing transmission can be performed via only one main motor, still a further feature of the present invention is that the blocking disk, and thereby also the maltese-cross disk, is driven from an auxiliary or servo motor via a transmission in controlled, intermittent manner. By appropriate controlling of the servo motor in connection with the main motor, the individual driven shafts can be driven one after the other by simple selection switches.

The servo motor can be dispensed with when, in accordance with still a further feature of the present invention, the blocking disk and thereby also the maltese-cross disk, is switchable in controlled manner via a coupling of the driving shaft which drives the driving pinion.

The motor-operated drive of the blocking disk, and thereby also the maltese-cross disk, can be dispensed with when, in accordance with an alternative solution according to the invention, the blocking disk is driven manually for actuating the maltese-cross disk.

For providing trouble-free engagement of the teeth of the intermediate gear with the teeth of each gear of a driven shaft, at least one gear is slowly turned during the engaging step. For this purpose, in accordance with yet another feature of the present invention, the motor for the driving pinion is connected with a resistor which throttles its speed, the resistor remaining connected only during the running time of the servo motor.

In order to switch on the motor drive of the maltese-cross either of the servo motor or the coupling after finding of the selected maltese cross position, on the one hand, and to switch on the main motor in the selected rotary direction and with full power in controlled manner, on the other hand, still a further feature of the present invention resides in the fact that the blocking disk is associated with an element which for beginning of the immovable position of the stepping transmission in connection with switches switches off the drive of the blocking disk in selected position, and by bridging of the resistor fully switches on the motor of the driving pinion. For adjusting the backrest pad and/or for adjusting the seat or head support, a further feature of the present invention is that one or several drive shafts of the distributing transmission are connected with a compressor for seat- or backrest-pad adjustment and/or a hydraulic pump for seat displacement.

In addition to the rotary outer or inner maltese-cross transmission, it is also possible to provide a maltese-cross transmission with translationally displaceable driven member which engages the intermediate gear in claw-like manner, displaceable in its axial direction and parallel to the axis of the driving pinion, and its transport slots extending normal to the displacement direction. Blocking grooves are spaced from one another in the displacement direction and arranged between the transport slots, and a blocking disk having a transport finger engages in the blocking groove.

The stepping transmission can be formed not only as a maltese-cross transmission, but also as a thrust-crank transmission with a thrust member which also serves for blocking the driven member supporting the intermediate gear. Also, a cam-stepping mechanism transmission can form the stepping transmission, wherein the driven member is displaceable in stepped manner by a transport arm controlled by a cam disk. Moreover, it is also possible to form the stepping transmission as a cam-rotary arresting transmission with a driven member which is in direct engagement with a transport disk having a cam track.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a side view showing a vehicle seat in broken lines with a seat frame which is supported on consoles connected with the vehicle body via adjusting elements in rear and front seat regions;

FIG. 2 is a plan view of the seat frame with adjusting elements arranged along a longitudinal side of the seat for longitudinal displacement and height adjustment of the seat, as well as with a distributing transmission actuating the adjusting elements;

DESCRIPTION OF THE PREFERRED EMBODIMENTS

Figure 3:
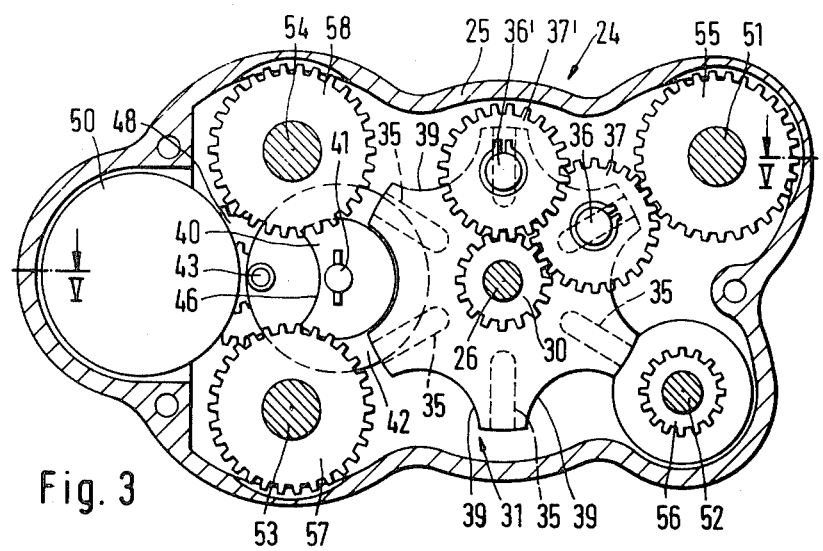
FIG. 3 is an enlarged view of the distributing transmission formed as a stepping transmission with an outer maltese-cross disk, in a section taken along the line 3—3 in FIG. 2.

FIG. 1 shows an example of a seat in which a distributing transmission in accordance with the invention can be provided. The vehicle seat has a seat part 10 and a backrest 11 arranged on a seat frame 12. The seat frame 12 is pivotally supported in its front and rear seat regions via turning pieces 13 on consoles 14 which are connected with guide rails 17 fixed on the vehicle body. The turning pieces 13 are formed, for example, as angular levers having one lever arm which is pivotally connected with the seat frame 12, the other lever arm being pivotally connected with hinge ears of threaded spindles 15.

Nuts of worm transmissions formed in adjusting devices 16 are arranged on the threaded spindle, and each nut is provided at its outer surface with a worm piece in which, for example, a worm located in the adjusting device 16 engages. A further adjusting device 18, which is formed for example also as a worm transmission, serves for longitudinal displacement of the seat frame 12, wherein a spindle nut formed as a worm gear surrounds a stationary threaded rod 19. For displacing the backrest 11, a hinge mount may be provided between the seat part 10 and the backrest 11 and have a motor-driven adjusting device 21 shown in broken lines in FIG. 1. The adjusting device 18 is arranged at at least one longitudinal side of the seat. The adjusting devices 16 and 21 can be arranged also at one longitudinal side of the seat. The adjusting movements can be transmitted to the other longitudinal side of the seat with the aid of a transmitting shaft 22. The adjusting devices 16, 18 and 21 are in connection with a distributing transmission 24 arranged, for example, in the central region of the seat frame, via flexible shaft 23.

Figure 4:
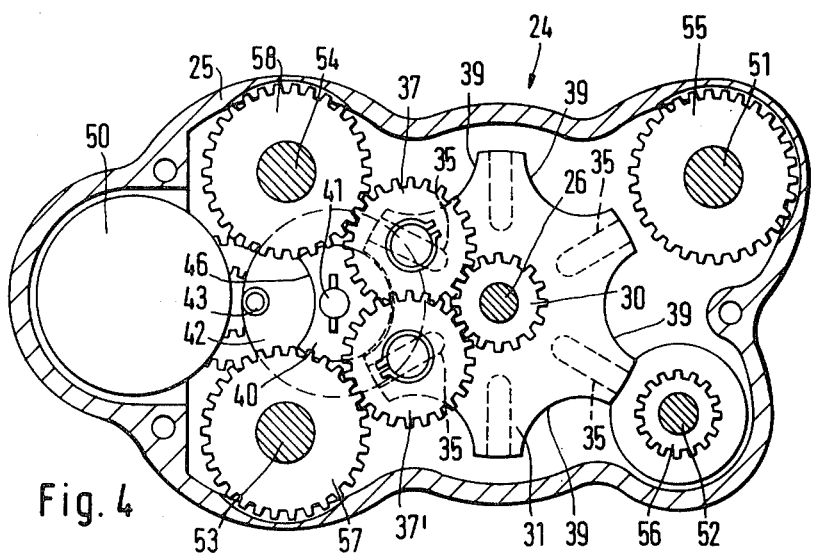
FIG. 4 is a view substantially corresponding to the view of FIG. 3, but showing the distributing transmission when the outer maltese-cross disk is turned for driving the height-adjusting element.
Figure 5:
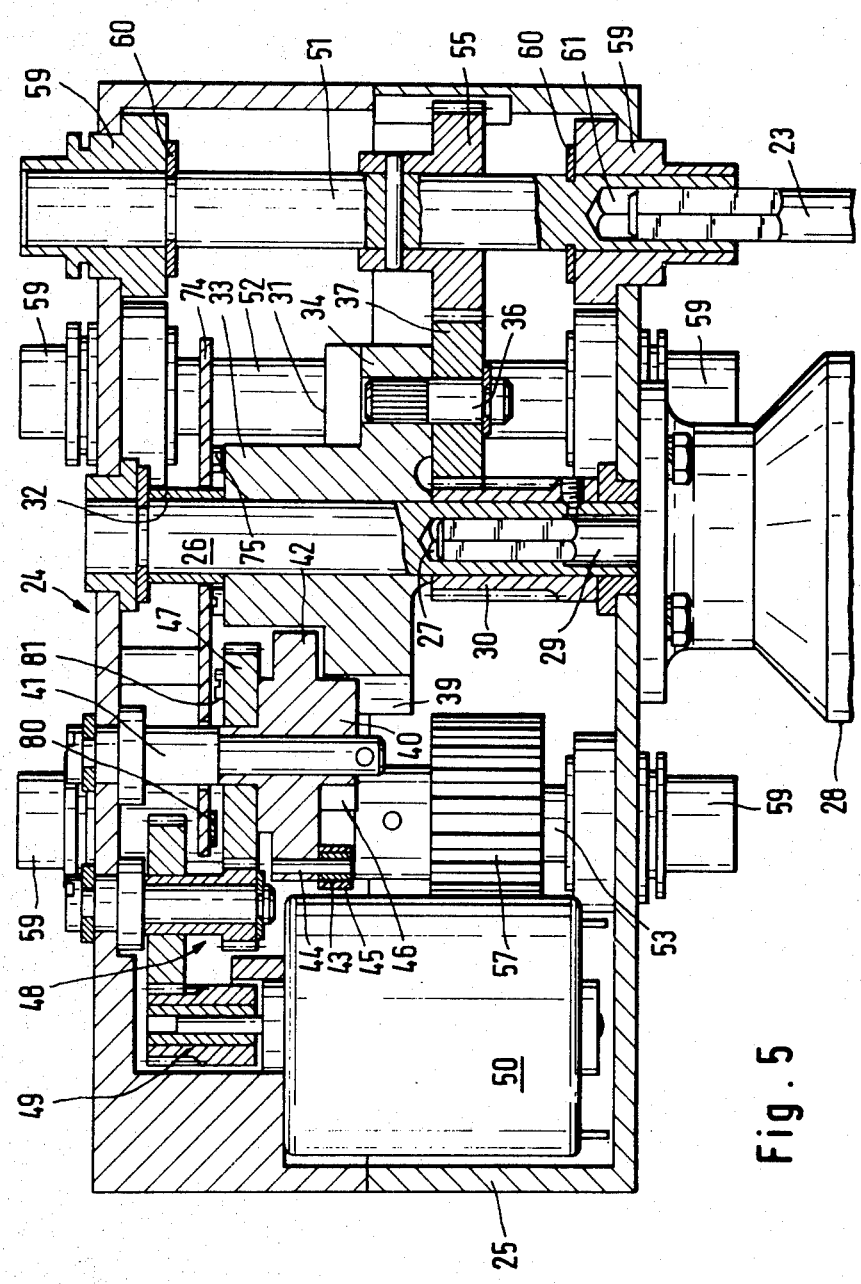
FIG. 5 is a view showing a section of the distributing transmission of FIGS. 3 and 4 taken along the line 5—5 in FIG. 3.

The distributing transmission in accordance with one embodiment of the invention is shown in FIGS. 3–5. It has a housing 25 and a driving shaft 26 which extends in a central region of the housing and is rotatably supported in opposite lateral walls of the latter. The driving shaft 26 has, as particularly shown in FIG. 5, a non-round opening 27. A shaft end 29 which is coupled with a main drive motor 28 engages in the opening 27. The drive motor 28 is shown as a flange motor in FIG. 5, and its shaft end engages directly into the driving shaft 26 in torque-transmitting manner. It is to be understood that, instead of the flange motor 28 mounted on the housing 25, a separate drive motor, for example mounted on a console, can be used, so that it is connected with the driving shaft 26 via a coupling shaft for torque transmission.

A driving pinion 30 is connected with the driving shaft 26 for joint rotation therewith immediately adjacent to the supporting bush of the housing 25 adjoining the main motor 28. A maltese-cross disk 31 is loosely rotatably supported on the driving shaft 26, in addition to the driving pinion 31. The maltese-cross disk 31 is not displaceable in axial direction on the driving shaft 26 because of its abutment against the driving pinion 30, on the one hand, and because, on the other hand, of its abutment against a spacer ring supported on a bush fixedly arranged on the housing with interposition of a safety ring. The maltese-cross disk has a supporting hub 33 and is provided at its side opposite to the driving pinion 30 in its disk portion 34 with transport slots which extend radially from the supporting hub 33 outwardly, these being identified by reference numeral 35. In the illustrated embodiment, six transport slots 35 are uniformly arranged at the periphery of the maltese-cross disk 31.

A supporting pin 36 extends in the plane of at least one transport slot 35 from the disk portion 34 into the side opposite to the driving pinion 30. An intermediate gear 37 is loosely rotatably supported on the supporting pin 36 and is in constant engagement with the driving pinion 30. For many cases only one intermediate gear 37 supported on the maltese-cross disk 31 can be provided for the purpose of the distributing transmission. However, for the reasons explained herein below, a further supporting pin 36' is arranged immediately near the intermediate gear 37 at a distance corresponding to the partial angle of the transport slots on the disk portion 34 of the maltese-cross disk, for receiving a further intermediate gear 37'.

Figure 7:
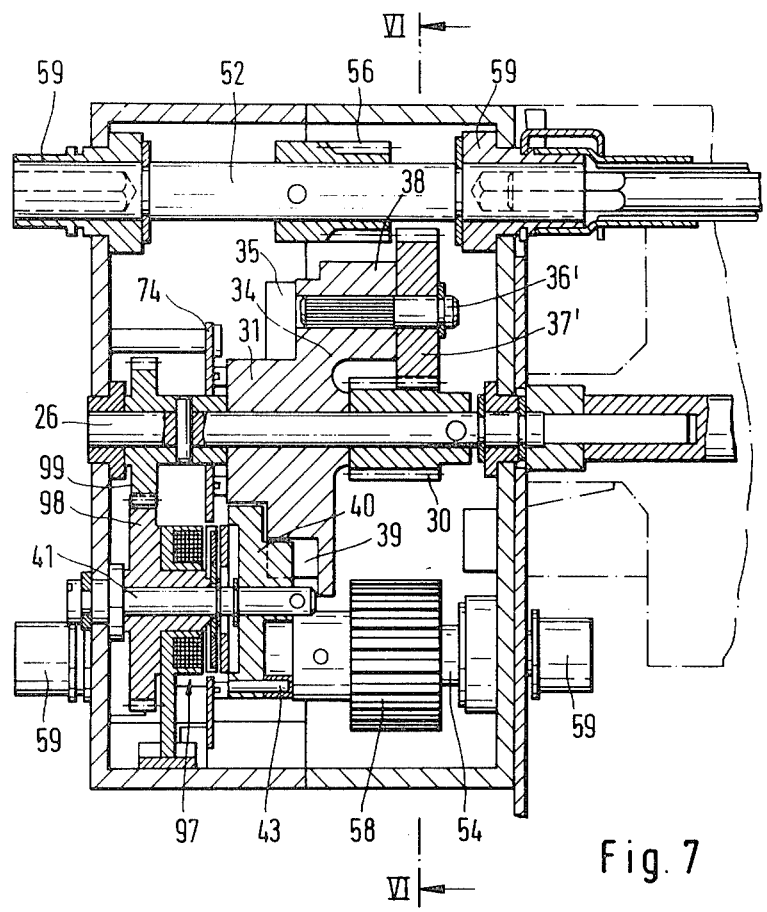
FIG. 7 is a view showing the distributing transmission of FIG. 4 in a section taken along the line 7—7 in FIG. 6.

The supporting pin 36' is first somewhat longer than the supporting pin 36, and the disk portion 34 has in the region of the supporting pin 36' a projection 38 which projects by the value of the tooth width of the intermediate gear 37 beyond the driving pinion 30, as can be seen in FIG. 7. Thereby the intermediate gears 37 and 37' are offset relative to one another in axial direction by their tooth width, and both engage in the driving pinion 30 having a respective tooth width. Since the transport slots 35 are arranged only in the partial region of the width of the disk portion 34, which is adjacent to the supporting hub 33, blocking grooves 39 are provided at the periphery of the disk portion 34 between the transport slots 35 and formed as cylindrical portions.

In the horizontal plane of the distributing transmission, a blocking disk 40 is arranged near the maltese-cross disk 31 on a rotary axle 41 fixed in the housing wall, so that a cylindrical portion of this blocking disk 40 closingly engages in the blocking groove 39 of the maltese-cross disk. Laterally adjacent to the disk portion 34, the maltese-cross disk 31 engages a flange 42 of the blocking disk 40. A transport finger 43 is mounted on the blocking disk 40 and is composed of a pin 44 which is held in the flange 42 and a rolling sleeve 45 having a noise-damping coating and supported on a free end of the pin. The rolling sleeve 45 fits into the transport slot 35 of the maltese-cross disk 31.

The rolling sleeve 45, which forms the free end of the transport finger 43, is surrounded by a circular recess 46 of the blocking disk portion 40. The circular recess is designed such that, during insertion of the transport finger 43 into the respective transport slot 35 of the maltese-cross disk, its periphery is released for rotation. The blocking disk 40, which is fixed in axial direction on the rotary axle 41 in a loosely rotatable manner, is connected for joint rotation with a gear 47 which is in rotary connection via a toothed gear 48 with a pinion 49 of for example electrically actuated auxiliary or servo motor 50.

Driven shafts, for example four driven shafts 51, 52, 53 and 54 in this embodiment, are grouped around the maltese-cross disk 41 and have gears 55, 56, 57 and 58, respectively, connected with the shafts for joint rotation therewith. The driven shafts 51-54 are so supported in the housing 25 of the distributing transmission that two diametrically opposite driven shafts, for example, the driven shafts 51 and 53, or the driven shafts 52 and 54, are located in one plane with two opposite transport slots 35 of the maltese-cross disk in blocking position. The maltese-cross disk is selected to have six transport slots 35 uniformly distributed over its periphery, and six blocking grooves 39 located therebetween. The blocking position of the maltese-cross disk is selected such that always two opposite transport slots lie in vertical direction, whereas two other pairs of transport slots are inclined at an angle of 30° from the horizontal.

The driven shafts 51 and 53, or the driven shafts 52 and 54, lie in the same inclined plane, whereas the driving pinion 30, the blocking disk 40 and the servo motor 50 are in the horizontal plane. As can be seen from FIGS. 3 and 4, the gears 55 and 56 have different pitch circles, the transmission ratio between the driving pinion 30 and the driven gear 55 being thereby different from the transmission ratio between the driving pinion 30 and the driven gear 56. Another transmission ratio is required because of the constant pitch circle of the intermediate gears 37 and 37' and different axial distances between the driving shaft 26 and the driven shaft 51, on the one hand, as well as the driving shaft 26 and the driven shaft 52, on the other hand. The driven shaft 51 is connected via flexible shaft 23 for rotary connection with the adjusting device 21 for the inclination adjustment of the backrest. The driven shaft 51 can also be connected via a flexible shaft 23 with the adjusting device 18 for the longitudinal displacement of the seat part. The gears 55 and 56 have such tooth widths as correspond to the tooth widths of the intermediate shafts 37 and 37'.

It is provided that the driven shafts 51 and 52 are driven simultaneously but after one another, and the gears 57 and 58 have a doubled tooth width as compared with the intermediate gears 37 and 37'. When the maltese-cross disk is in such a position that it is blocked as shown in FIG. 4, both driven shafts 53 and 54 are simultaneously driven via the intermediate gears 37 and 37'. When the driven shaft 53 is connected via flexible shaft 23 with the adjusting device for the lifting movement of the front seat region, and the driven shaft 54 is connected with the adjusting device 16 for the lifting movement of the rear seat region, the vehicle seat is raised or lifted as a whole in dependence upon the direction of rotation of the driving pinion 30. When it is necessary to adjust only the front or the rear seat region, the maltese-cross disk is turned in such a position in which either the intermediate gear 37 is in engagement only with the gear 58 or the intermediate gear 37 is in rotary connection with the gear 57. It is to be understood that the gears 57 and 58, as well as the intermediate gears 37 and 37', are arranged in the same plane as that in which the driving pinion 30 is located.

The gears 56 and 55 are arranged in the same plane in which is located the intermediate gear 37 and are connected with the driven shafts 51 and 52 for joint rotation therewith. Each of the four driven shafts 51-54 is supported at both sides in supporting bushes 59, and these bushes are fixed in opposite lateral walls of the housing 25, which latter is subdivided in the shown example along the longitudinal central axis. The driven shafts are held in axial position via safety rings 60 and extend at both sides outwardly beyond the housing of the distributing transmission. The ends of the driven shafts 51-54 do not, however, extend beyond a protective sleeve formed on each supporting bush 59. For transmission of torque, the ends of each driven shaft 51–54 are provided with a non-round opening 61 in which a corresponding pin of a flexible shaft 23 can be received in torque-transmitting manner, as is shown for the lower end of the driven shaft 51 in FIG. 5.

Figure 8:
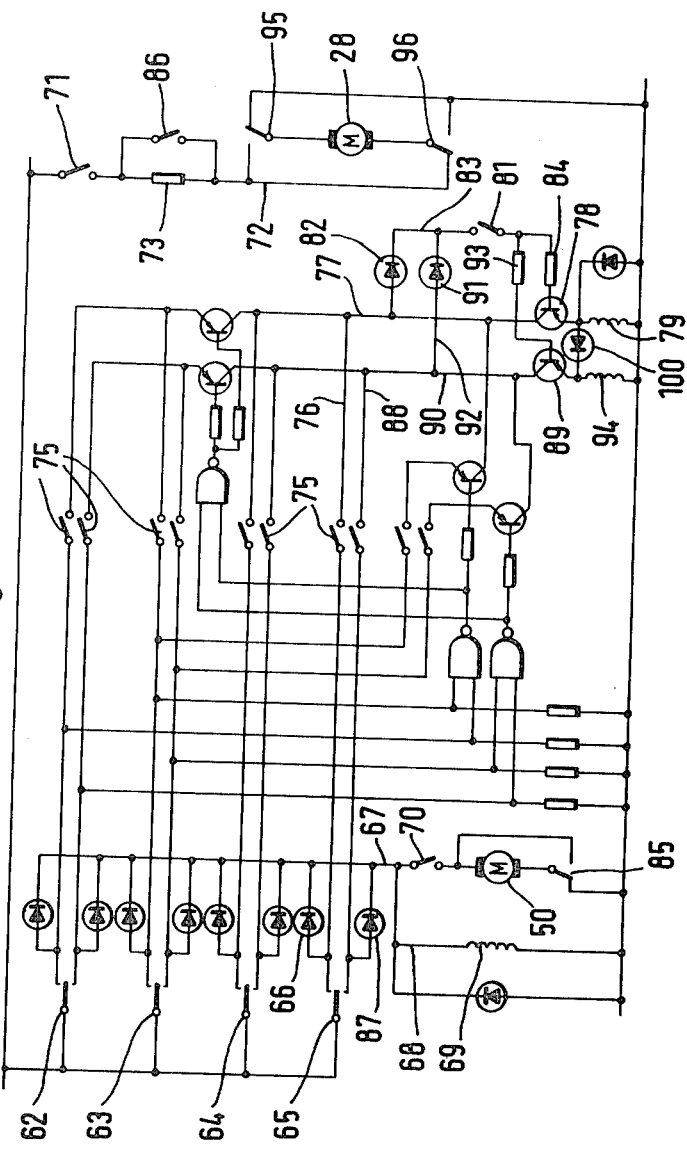
FIG. 8 is a view showing a diagram for controlling the distributing transmission shown in FIGS. 3–5, wherein in addition to a drive motor for the driven shaft, a servo motor for drive of the disk is provided.

The operation of this distributing transmission can be understood with the aid of a diagram shown in FIG. 8. The seat adjustment, and thereby the operation of the distributing transmission 24, is provided by manually actuaated two-way switches 62, 63, 64 and 65. The two-way switch 62 is arranged for starting the driven shaft 53, which drives the front seat-height adjustment device 16, whereas the two-way switch 63 switches the driven shaft 54 for actuation of the rear seat-height adjustment device 16. The actuation of both switches 62 and 63 simultaneously and in the same direction results in raising or lowering of the seat. The two-way switch 64 is arranged so that the driven shaft 52 can be moved for displacement of the entire vehicle seat in one rotary direction, whereas finally the two-way switch 65 is arranged so that the driven shaft 51 can be driven in rotary movement to make thereby possible a turning movement of the backrest 11.

The actuation of the switch 55 for inclination adjustment of the backrest can serve for illustration of the functions of the distributing transmission. When the two-way switch 65 shown in the diagram of FIG. 8 is turned upwardly from its central position corresponding to the zero position, a current flows first from a diode 66 and conductors 67 and 68 to relay 69, which closes a switch 70 to a servo motor 50. Thereby the servo motor is driven in movement. Simultaneously, the relay 69 closes a switch 71, so that via a main conductor 72 and an intermediate resistance 73 the main motor 28 is driven in movement at a slower speed, in order to facilitate by slow movement of the intermediate gears 37, 37' the interengagement of the teeth of the intermediate gear and the gear 55. With switching on of the servo motor 50, the blocking disk 40 is rotated via the toothed gear 48 and the gear 47. The blocking disk 40 engages with its transport finger 43 in the next transport slot 35 of the maltese-cross disk 31 and rotates the latter by one switch step further, wherein the switch step with the illustrated maltese-cross disk is equal to a rotary angle of 60°.

During rotation of the maltese-cross disk 31, a brush member mounted thereon rotates over a conductive card 74 in the distributing transmission, whereby the conductive path forming the switch 75 is closed, so that a current can flow through the conductors 76 and 77, after which a further relay 79 is connected. The relay 79 is, however, without current as long as a transistor 78 does not receive a control voltage. A switch 80 is associated ith the rotary blocking disk 40 and closes a contact 81 in a conductor 83 having a diode 82 and being parallel to the conductor 77. A resistance 84 connected in series with the transistor 78 is connected with a conductor 83, so that the transistor 78 obtains its control voltage via the contact 81. Thereby the current generated in the conductor 77 at the transistor 78 can first flow to the relay 79 and via a diode 100 to relay 94, so as to actuate the latter. The relay 79 actuates the switches 25 and 26 and poles the motor so that the lifting direction corresponding to the upper switch position of the switch 65 is established. The relay 24 actuates the switch 85 and short-circuits thereby the servo motor 50, whereby further rotation of the maltese-cross disk 31 is ended. The switch 86 is further closed, whereby the resistance 73 is bridged and the motor 28 is driven to full speed. By appropriate arrangement of the brushing member, the dead position of the maltese-cross disk 31 is controlled such that, during actuation of the switch 65 in the above described manner, the maltese-cross disk is fixed in the position shown in FIGS. 3 and 5. Thereby the driving movement coming from the main motor 28 in the motor pinion 30 is transmitted via the intermediate gear 37 to the gear 55 and the drive shaft 51 connected therewith for joint rotation. The adjustment movement is terminated when the switch 65 is brought to the central position, whereby the relay 69 becomes without current, the switch 71 opens, and the current supply to the main motor 28 is interrupted.

When the backrest must be turned in another direction, the switch 65 is actuated downwardly, so that the conductor 67 is supplied with current via a diode 87. Thereby the servo motor, for the case where the first-performed adjustment is a backrest adjustment, is not activated, inasmuch as the switch 70 is closed by the relay 69. Simultaneously, a switch 85 short-circuits the motor 50 through a relay 94. If, however, another adjustment has taken place before, the servo motor 50 is actuated in the same manner as described above. However, the current flows because of the closing of switch 75, produced by the maltese-cross disk 31, via a conductor 88 and supplies a transistor 89 via a conductor 90. Simultaneously, a conductor 92 having a diode 91 and connected to the conductor 83 is connected with the conductor 90. By the brush 80, which is fixed on the blocking disk 40 or the gear 47, the interrupted conductive path 81 on the conductive card 74 is closed. Thereby a relay 94 is actuated, so that the servo motor 50 is short-circuited by the switch 85 and the resistance 73 is bridged by the switch 86, whereby the main motor 28 runs at full speed.

By actuation of other switches, for example the switches 62, 63 or 64 in the above described one or other switching direction analogously to the actuation of switch 65, analogous switch movements are performed by the above described control, whereby a certain holding position of the maltese-cross disk 31 is associated with each of the switches 62–65.

Figure 6:
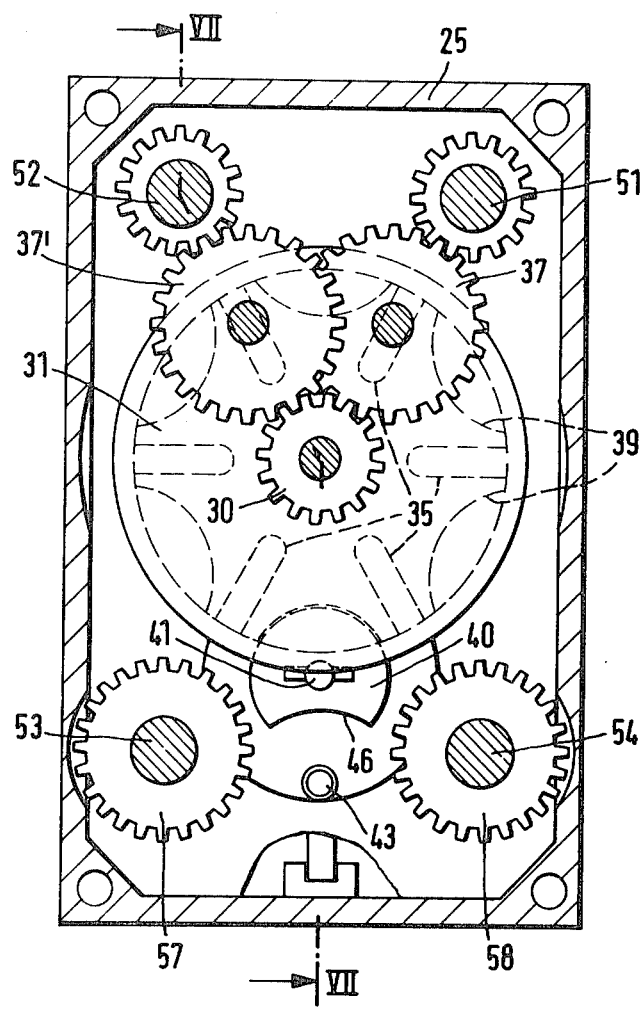
FIG. 6 is a view showing a distributing transmission in accordance with a further embodiment of the present invention in a longitudinal section taken along the line 6—6 in FIG. 7, wherein the drive of the maltese-cross disk is performed via a coupling from a drive motor.

The embodiment shown in FIGS. 6 and 7 differs from that shown in FIGS. 3 and 4, in that the servo motor is replaced by an electromagnetic coupling 97 acting upon the blocking disk 40, so that the blocking disk 40 is coupled with a gear 98 rotating on the same rotary axle 41. The gear 98 engages with a pinion 99 fixedly arranged on the driving shaft 26 for joint rotation therewith, so that with the switched-on coupling 97 the blocking disk 40 is rotated in dependence upon the driving shaft 26. The other structural elements are identical to those of FIGS. 3–5 and correspond to the same. The function of the arrangement shown in FIGS. 6 and 7 is analogous to the function of the arrangement shown in FIGS. 3–5, whereby instead of the servo motor the electromagnetic coupling 27 is switched, and thereby the drive of the blocking disk and the maltese-cross disk is performed from the main drive shaft 26.

Figure 9:
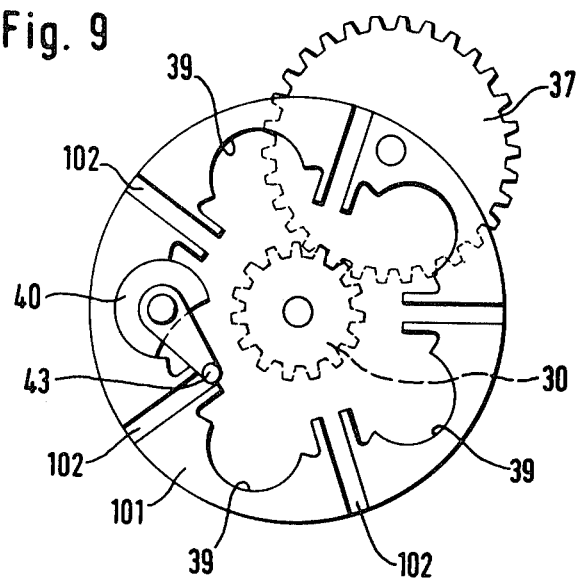
FIG. 9 is a view showing schematically a stepping transmission including a rotary inner maltese-cross disk.

In the above described embodiments, the stepping transmission is formed as a maltese-cross transmission with the driven member 31 formed as the maltese-cross disk with the outwardly open transport slots 35. It is also possible to form the maltese-cross transmission with a maltese-cross disk 101 having transport slots 102 which are open inwardly. The maltese-cross disk is ring-shaped and is received in the interior of the blocking disk 40 with its blocking finger 43, the blocking grooves 39 also being arranged inwardly as can be seen from FIG. 9. The intermediate gear 37 is supported on the maltese-cross disk 101, forming the driven member of the inner maltese cross transmission, and engages with the driven pinion 30.

Figure 10:
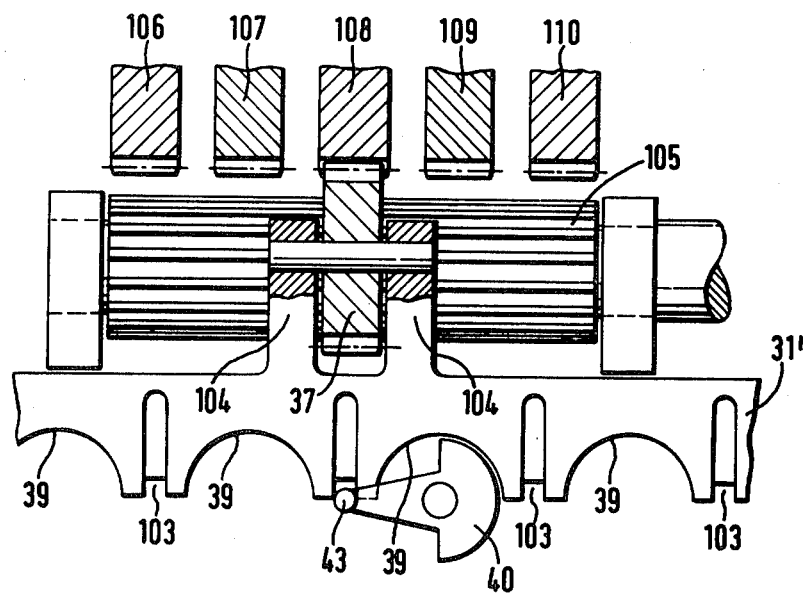
FIG. 10 is a view showing a stepping transmission which has a maltese-cross transmission including a translationally movable driven member.

FIG. 10 shows a maltese cross transmission with a translationally movable toothed rack-shape driven member 31'. The driven member 31' has a plurality of transport slots 103 which are open downwardly and arranged at distances from one another. The blocking grooves 39 are provided between the transport slots 103. The stationary, rotatably supported blocking disk 40 can rotate in the blocking grooves 39. The transport finger 43 of the blocking disk 40 can engage in the transport slots 103, and thereby displace the driven member, in dependence on the direction of rotation of the blocking disk, to the right or to the left. A fork-shaped support 104 is arranged above the driven member 31', and the intermediate gear 37 is supported by the same, so that the intermediate gear 37 can displace together with the driven member 31 in its longitudinal direction. The intermediate gear 37 is in engagement with a motor-driven driving pinion 105 and transmits the rotary movement of the driving pinion 105 to one of gears 106-110, which are arranged near one another and offset relative to the periphery of the intermediate gear 37. The gears 106-110 can have different diameters and axial distances in correspondence with the required transmission ratios. For the sake of clarity, the gears 106-110 are shown as located in one plane.

Figure 11:
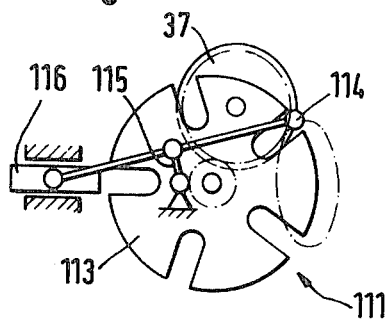
FIG. 11 is a view schematically showing an outer stepping transmission as a thrust-crank transmission.
Figure 12:
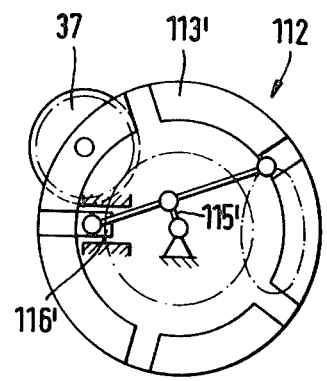
FIG. 12 is a view schematically showing a stepping transmission formed as a thrust-crank transmission with a driven member which is formed as a disk with inwardly open transport slots.

FIGS. 11 and 12 schematically show the stepping transmission formed as a thrust-crank transmission 111, 112. A disk-shaped driven member 113 shown in FIG. 11 has outwardly open transport slots, in which a follower 114 of a pushing rod supported on a crank 115 engages. The other end of the pushing rod is pivotally connected with a pushing member 116, which in turn can engage in the transport slots of the driven member 113 for blocking purposes.

The thrust-crank transmission 112 shown in FIG. 12 has a driven member 113' with transport slots which are open inwardly, so that the pushing rod with a pushing member 116' and a crank 115' are arranged inwardly relative to the driven member 112'. In this thrust-crank transmission, at least one intermediate gear 37 is supported on the driven member 113 or 113' and constantly engages with a centrally arranged driving pinion.

Figure 13:
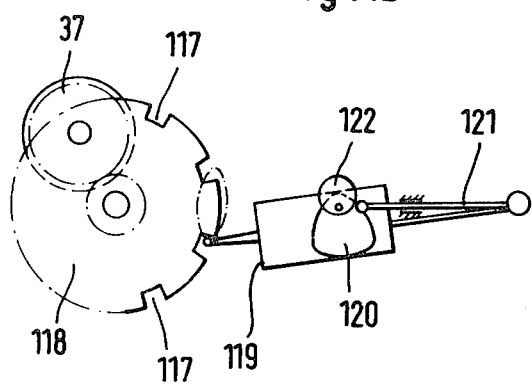
FIG. 13 is a view schematically showing a stepping transmission formed as a cam-stepping mechanism transmission with cam disks and transport arm.

The stepping transmission shown in FIG. 13 is formed as a cam mechanism transmission. A driven member 118 having transport recesses 117 can be rotated by a transport rocking arm 119 in stepped manner. The transport arm 119 can be reciprocated by a cam 120, on the one hand, and, on the other hand, is pivotally connected with a pushing rod 121. The pushing rod 121 abuts against a second cam 122 by which the transport arm 119 can reciprocate via the pushing rod 121. Thereby, an ellipse-like movement path shown in broken lines is produced.

Figure 14:
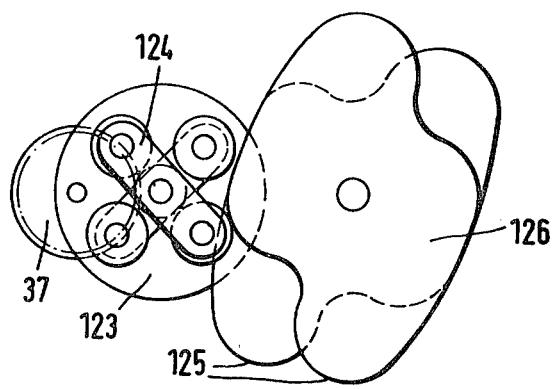
FIG. 14 is a view showing schematically a stepping transmission formed as cam-rotary arresting transmission with a driven member which is rotatably connected with a roller member.

The stepping transmission schematically shown in FIG. 14 is formed as a cam-rotary arresting transmission. Its driven member receives and rotatably supports at least one intermediate gear 37, on the one hand, and contains a rolling piece 124, on the other hand. The rolling piece rolls over a curved track 125 of a transport disk 126, wherein a desired transport step is obtained by appropriate design of the curve.

Figure 15:
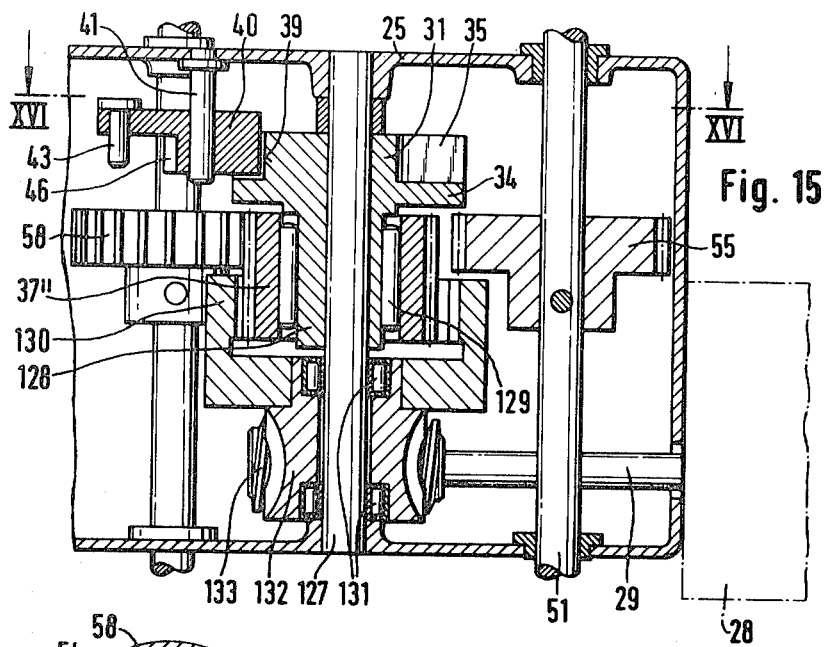
FIG. 15 is a view showing a distributing transmission in accordance with another embodiment of the present invention with a stepping transmission having an outer maltese-cross disk, wherein the intermediate gear connectable with the driven shaft is driven via an internal gear connected with a worm transmission, in a section taken along the line 15—15 in FIG. 16.
Figure 16:
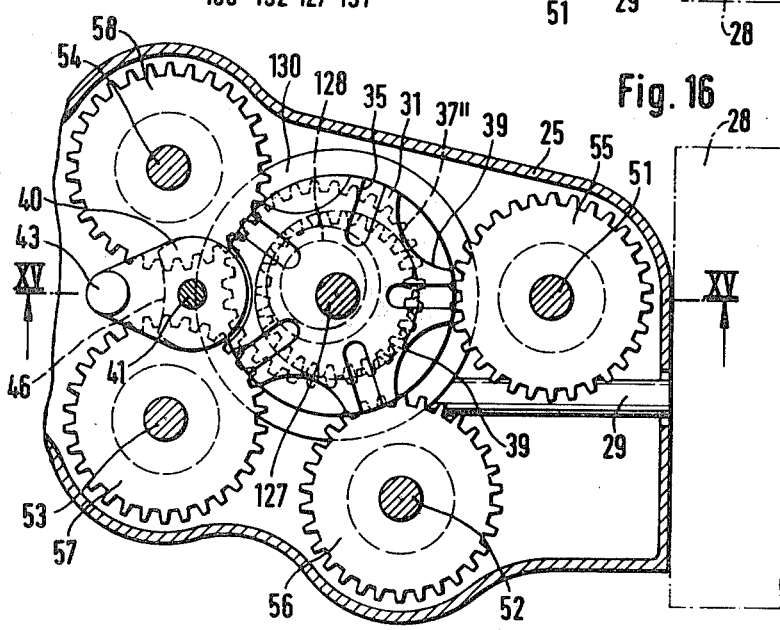
FIG. 16 is a view showing the distributing transmission of FIG. 15 in a vertical section taken along the line 16—16 of FIG. 15.

In the stepping transmission shown in FIGS. 15 and 16, a central axle 127 extends through the central region of the transmission housing 25. The maltese-cross disk 31, which belongs to the driven member of the stepping transmission, is rotatably supported on the central axle 127. The maltese-cross disk has an extension formed as an eccentric portion 128 which surrounds the central axis 127. An intermediate gear 37" is rotatably arranged on the eccentric portion 128 via a roller bearing 129. The disk portion 34 of the maltese-cross disk 31 is provided at its sides facing away from the eccentric portion 128 with a plurality of radially extending, outwardly open transport slots 35, which are uniformly distributed over its periphery. The number of slots shown in FIGS. 15 and 16 is equal to five, wherein the blocking grooves 39 are provided between respective transport slots. The blocking disk 40 engages in the blocking grooves 39, as in the embodiments described above, and is supported on the rotary axle 41 held in the housing 25. The blocking disk 40 has a transport finger 43 for engagement in the transport slots 35 of the maltese-cross disk 31. The drive of the blocking disk 40 serving as a switch gear can be performed in the manner described above from a controllable servo motor, not shown in FIGS. 15 and 16. In this blocking disk 40, the transport finger 43 is surrounded by the recess 46 which, with the transport finger 43 engaging in the transport slots 35, can pass without difficulty the outer periphery of the maltese-cross disk. An internal gear 130 is in constant engagement with the gear 37" and is connected for joint rotation with a worm gear 133 which is rotatably mounted on a central axle 127, for example with interposition of a roller bearing 131. A worm 133 engages with the worm gear 132 and is connected for joint rotation with the shaft end 29 with the main drive motor 28. The drive motor 28 can be flanged on the housing 25. For grouping the driven shafts 51-54 around the intermediate gear 37", the driven shafts are rotatably supported in the housing 25 and are spaced from one another by such an angle which corresponds to at least the angle of spacing of the transport slots 35 of the maltese-cross disk 31, or to twice the angle between two transport slots. One gear 55, 56, 57, 58 is connected with each driven shaft 51-54 for joint rotation therewith and arranged near the internal gear 130 so that the intermediate gear 37" can be selectively brought into engagement with the gears 55-58 in dependence upon the position of the stepping transmission. The distance of the respective driven shafts 51-54 from the center of the central axle 127 corresponds to the sum of the rolling-circle radius of the intermediate gear 37", the rolling-circle radius of the respective gear 55-58 arranged in engagement therewith, and the eccentricity of the eccentric portion 130 relative to the central axle.

The operation of the arrangement shown in FIGS. 15 and 16 substantially corresponds to the operation of the arrangements shown in FIGS. 3-5 and FIGS. 6-7. With the aid of the blocking disk 40, which serves as a switch gear, the intermediate gear, serving as a transmission gear, 37" is brought into a selected position in association with a driven shaft or a gear arranged thereon. FIGS. 15 and 16 show that the transmission gear 37" is brought into engagement with the gear 58 of the driven shaft 54. This positioning of the drive is performed via the respective rotation of the blocking disk 40, which can for example be driven via a not shown servo motor and transmission stages. With a respective revolution of the blocking disk 40, its transport finger 43 engages in a transport slot 35 of the maltese-cross disk 31 and turns the same by the angle between two transport slots. Thereby, via the eccentric portion 128, the engagement location of the transport gear 37" rotatably supported on the eccentric portion is displaced by the same angle, so that the transmission gear 37" is brought into engagement with the selected gear of a driven shaft, in dependence on the number of revolutions of the blocking disk 40.

The main drive motor is switched on after the servo motor is switched off and the blocking disk 40 assumes the blocking position in the blocking groove 39 shown in FIG. 16. The main drive motor 28 then drives, via the worm 133, the worm gear 132 and the internal gear 130 connected therewith. The internal gear 130 is in constant engagement with the transmission gear 37" supported on the eccentric portion 128, which has a tooth width double the tooth width of the internal gear 130. In the embodiment shown in FIGS. 15 and 16, the maltese-cross disk 31 and the eccentric portion 128 connected therewith are adjusted so that the transmission gear extending outwardly beyond the internal gear is in engagement with the gear 58 of the driven shaft 54 and the latter is driven by rotation of the transmission gear 37". In dependence upon the position of the maltese-cross disk, the respective gear 55, 56, 57, 58 can be brought into engagement with the transmission gear 37".

As mentioned above, the above described and illustrated embodiments of the invention are only exemplary, and do not limit the present invention. There are many other embodiments of the invention possible. For example, the number of driven shafts is not limited to four as shown in the drawing. In the shown and described embodiments, it is possible to provide two additional driven shafts diametrically opposite to one another and arranged in a vertical plane, without increasing the dimensions of the maltese-cross disk, when the electrical circuit is correspondingly designed. With the additional driven shafts, a head support adjustment can be provided, on the one hand, and a pump can be driven so that the rear cushion of the seat follows the seat position of the user, on the other hand.

It will be understood that each of the elements described above, or two or more together, may also find a useful application in other types of constructions differing from the types described above.

While the invention has been illustrated and described as embodied in a vehicle seat and an arrangement for adjusting the same, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for adjusting a seat of a vehicle, particularly a motor vehicle, comprising
   a plurality of adjusting elements arranged to adjust a position of a seat;
   drive means including a drive motor; and
   distributing transmission means provided between said drive motor and said adjusting elements and including a plurality of driven shafts having gears and connected with said adjusting elements and at least one intermediate gear driven by said motor, said distributing transmission means including a stepping transmission arranged so that with a selectable step said stepping transmission brings said intermediate gear into a driving position with the gear of a respective one of said driven shafts and said intermediate gear is fixed in said position without preventing its rotation about its axis.

2. An arrangement as defined in claim 1, wherein said drive motor has a driving pinion, said intermediate gear being in constant engagement with and driven by said driving pinion of said driven motor.

3. An arrangement as defined in claim 1, wherein said stepping transmission is formed as a Maltese-cross transmission.

4. An arrangement as defined in claim 1, wherein said stepping transmission is formed as a Maltese-cross transmission which has a driven member cooperating with said intermediate gear and formed as a rotary Maltese-cross disc with a plurality of open transport slots.

5. An arrangement as defined in claim 4, wherein said slots of said Maltese-cross disc of said Maltese-cross transmission extend radially and are, open outwardly.

6. An arrangement as defined in claim 4, wherein said slots of said Maltese-cross disc of said Maltese-cross transmission extend radially and are open inwardly.

7. An arrangement as defined in claim 4, wherein said drive motor has a driving pinion having an axis, said Maltese-cross disc being arranged coaxially with said driving pinion of said drive motor.

8. An arrangement as defined in claim 4, wherein said Maltese-cross transmission has a central axle, said driven member formed by said Maltese being rotatably supported on said central axle and having an eccentrical portion supporting said intermediate gear, said driven shafts being grouped around said central axle at predetermined distances said motor having an internal gear driven thereby, and said intermediate gear being in constant engagement with said internal gear of said motor and selectively engageable with the gear of a respective one of said grouped driven shafts.

9. An arrangement as defined in claim 8, wherein said transport slots of said Maltese-cross disc of said Maltese cross transmission extend radially and are open outwardly.

10. An arrangement as defined in claim 8, wherein said distributing transmission means includes a worm driven by said drive motor, and a worm gear engaging with said worm and supported on said central axle, said internal gear of said drive motor being fixedly connected with said worm gear for joint rotation therewith.

11. An arrangement as defined in claim 4, wherein said Maltese-cross disc has a peripheral side, said transport slots having openings which are open at and uniformly distributed over said peripheral side, said Maltese-cross disc also having a plurality of blocking grooves formed at said peripheral side and each provided between the openings of two neighboring ones of said transport slots, said distributing transmission means having a blocking disc having a transport finger and engageable in one of said blocking grooves of said Maltese-cross disc.

12. An arrangement as defined in claim 11, wherein said Maltese-cross disc of said Maltese-cross transmission has a peripheral surface provided with a plurality of cylindrical portion which form said blocking grooves and form-lockingly correspond to said blocking disc, said blocking disc being provided at its periphery with a circular recess releasing said Maltese-cross disc.

13. An arrangement as defined in claim 12, said blocking disc has a center, said circular recess having a deepest point, and said blocking disc having a collar, said transport finger being arranged on said collar on an extension of a line extending through said center of said blocking disc and said deepest point of said circular recess of said blocking disc.

14. An arrangement as defined in claim 13, wherein said distributing transmission means has a pin fixedly connected with said collar to form said transport finger and having an outwardly extending end, and a noise-absorbing rolling sleeve fitting into said transport slots of said Maltese-cross disc and surrounding said outwardly extending end of said pin.

15. An arrangement as defined in claim 1, wherein said distributing transmission means includes a second such intermediate gear driven by said motor and arranged so that said second intermediate gear is brought by said stepping transmission into a driving position with the gear of another of said driven shafts and fixed in said position without preventing its rotation about its axis.

16. An arrangement as defined in claim 1, and further comprising further drive means including a servomotor and a gearing, said stepping transmission being driven controllably and intermittently from said servomotor via said gearing.

17. An arrangement as defined in claim 11, wherein said drive motor has a driving shaft, a driving pinion driven by said driving shaft and being in constant engagement with said intermediate gear, and a coupling provided on said driving shaft and controllably switching said blocking disc.

18. An arrangement as defined in claim 11, wherein said blocking disc is arranged so that it is driven manually for actuating said Maltese-cross disc of said Maltese-cross transmission.

19. An arrangement as defined in claim 16, wherein said drive means has a resistance which throttles the rotary speed of said drive motor and remains switched only during running time of said servomotor.

20. An arrangement as defined in claim 11, wherein said blocking disc is associated with an element arranged so that in the beginning of an inoperative position of said stepping transmission said element switches off the drive of said blocking disc in the selected position and by bridging said resistance fully switches on said drive motor.

21. An arrangement as defined in claim 1, wherein said adjusting elements include a compressor arranged for adjusting seat and back pads and connected with one of said driven shafts of said distributing transmission means.

22. An arrangement as defined in claim 1, wherein said adjusting elements include a hydraulic pump arranged for displacing a seat and connected with one of said driven shafts of said distributing transmission means.

23. An arrangement as defined in claim 4, wherein said drive motor has a driving pinion having an axis, said intermediate member having an axis, said driven member of said Maltese-cross transmission being translatorily displaceable, surrounding said intermediate gear in a claw-like manner and displacing parallel to the axis of said intermediate gear and the axis of said driving pinion of said drive motor, said transport slots extending normal to the direction of translatory displacement of said driven member.

24. An arrangement as defined in claim 23, wherein said translatorily displaceable driven member has a plurality of blocking grooves spaced from one another in said direction of translatory displacement and arranged between said transport slots, said distributing transmission means including a blocking disc having a transport finger and engageable in said blocking grooves.

25. An arrangement as defined in claim 1, wherein said stepping transmission is formed as a thrust-crank transmission which includes a driven member supporting said intermediate gear and a thrust member which in addition to thrusting functions also provides for blocking of said driven member.

26. An arrangement as defined in claim 1, wherein said stepping transmission is formed as a cam-stepping mechanism transmission which includes a transport arm, a cam disc controlling said transport arm, and a driven member cooperating with said intermediate gear and displaceable in a stepped manner by said transport arm.

27. An arrangement as defined in claim 1, wherein said stepping transmission is formed as a cam-rotary arresting transmission which includes a transport disc provided with a cam track, and a driven member cooperating with said intermediate gear and directly engaging said cam track of said transport disc.

28. A seat of a vehicle, particularly a motor vehicle, comprising
   a seat element;
   a plurality of adjusting elements arranged to adjust a position of said seat element;
   drive means including a drive motor; and
   distributing transmission means provided between said drive motor and said adjusting elements and including a plurality of driven shafts having gears and connected with said adjusting elements and at least one intermediate gear driven by the motor, said distributing transmission means including a stepping transmission arranged so that with a selectable step said stepping transmission brings said intermediate gear into a driving position with the gear of a respective one of said driven shafts and said intermediate gear is fixed in said position without preventing its rotation about its axis.

29. A transmission unit for adjusting a seat of a vehicle, particularly a motor vehicle, and provided between a plurality of adjusting elements arranged to adjust a position of a seat and drive means including a drive motor, the transmission unit comprising a plurality of driven shafts having gears and connected with the adjusting elements, at least one intermediate gear driven by the motor, and a stepping transmission arranged so that with a selectable step said stepping transmission brings said intermediate gear into a driving position with the gear of a respective one of said driven shafts and said intermediate gear is fixed in said position without preventing its rotation about its axis.

* * * * *